United States Patent Office 3,694,378
Patented Sept. 26, 1972

---

3,694,378
PROCESS FOR THE PREPARATION OF CATALYSTS CONTAINING CRYSTALLINE ALUMINOSILICATE ZEOLITES
Johannes Ebregi, Boomweijdt 15, Heiloo, Netherlands
No Drawing. Filed Mar. 27, 1970, Ser. No. 23,474
Claims priority, application Netherlands, Mar. 31, 1969, 6904913
Int. Cl. B01j 11/36, 11/40
U.S. Cl. 252—451                                        9 Claims

ABSTRACT OF THE DISCLOSURE

In the preparation of catalysts containing crystalline aluminosilicate zeolites, a zeolite is introduced into a silicon dioxide sol and/or gel, and/or into a separately prepared co-gel of silicon dioxide and an oxide of at least one metal from Groups III–A and IV–A of the periodic table, such as aluminum oxide, and the co-gel, which may be wet or dried, is mixed with the silicon dioxide sol and/or gel prior to the drying of the latter, whereupon the resulting composition is gelled, if not already fully gelled, and then dried and activated.

---

This invention relates generally to the preparation of catalysts containing crystalline aluminosilicate zeolites, and more particularly is directed to an improved process for the preparation of such catalysts, which process is generally of the type in which a crystalline aluminosilicate zeolite is incorporated in a silicon dioxide-containing matrix material in the form of a sol or gel, whereupon the matrix material is set to a gel, if not already in that form, the gel is dried, and activated.

A process of the above type is already disclosed in U.S. Patent No. 3,140,249, wherein crystalline aluminosilicate having uniform pore openings of a size ranging from 6–15 A. is dispersed in a silicon dioxide-containing sol or gel. Encapsulated catalysts can be prepared in this way to consist of a crystalline aluminosilicate zeolite embedded in a silicon dioxide-containing material, such as, silicon dioxide/aluminum oxide.

Crystalline aluminosilicate zeolites, which are frequently termed "molecular sieves," are themselves excellent catalysts for hydrocarbon reactions, more particularly, for petroleum hydrocarbon reactions. However, difficulties are encountered in the use of these zeolites as such, that is, without the use of a matrix. The small dimensions of the crystals, which are sometimes less than 5 microns, make them difficult to handle in fluidised or moving catalyst beds and, in addition, the fragility of the crystals causes attrition, fracture and frictional losses. Furthermore, in many cases they are too active and their steam stability is too low, that is, the catalyst has too low a resistance to treatment with steam a high temperatures, for example, as used in the regeneration of cracking catalysts.

These factors have led to the development of the above-mentioned encapsulated catalysts containing zeolites, which have good resistance to friction and steam-treatment, and such high activity and selectivity, as defined hereinafter, so that, despite their higher price, they can compete successfully with conventional cracking catalysts, for example, silica-alumina cracking catalysts.

In order to reduce catalyst costs, it has already been proposed to replace part of the encapsulated zeolite-containing catalyst by a conventional catalyst. For example, Dutch patent application 6,606,201, discloses that a physical mixture of a conventional amorphous hydrocarbon conversion catalyst and a catalyst containing a crystalline aluminosilicate zeolite in a silica-containing matrix yields a catalytically active composition which can advantageously be used for hydrocarbon reactions, more particularly for catalytic cracking. The physical mixture of the mentioned components is obtained by weighing the appropriate amount of each component in the form of a dry powder and mixing the components. The catalytically active mixtures obtained in this way are, however, still inadequate in respect of the stringent quality requirements existing at the present time.

The activity and selectivity of catalysts are important factors in assessing the quality of catalysts. These characteristics can be determined from the behaviour of the catalyst when used for catalytic cracking under specific reaction conditions with a specific petroleum fraction, for example, a Mid-Continent gas oil having a boiling range from 272–405° C. The activity of the catalyst required to give equal conversion. The selectivity of the feed by weight (W.H.S.V.) through the catalyst under examination and the W.H.S.V. through a standard catalyst required to give equal conversion. The selectivity of the catalyst can be expressed by the gasoline factor, the gas factor and the coke factor. The selectivity of the catalyst expressed in the form of the gasoline factor is defined as the ratio between the gasoline yield by weight ($C_5^+$ up to 204° C.) using the catalyst under investigation and the gasoline yield by weight using a standard catalyst, with both yields being determined for the same conversion. The gas factor and the coke factor can be defined similarly. The above mentioned conversion occurring during cracking is defined as follows:

$$\text{Conversion in percent} = \frac{W_F - W_f}{W_F} \times 100$$

in which $W_F$ is the weight of feed; and
$W_f$ is the weight of all of the fractions having a boiling point above 204° C.

It has now been found that the activity and/or the selectivity of encapsulated crystalline aluminosilicate zeolite-containing catalysts can be greatly improved by combining the zeolite under special conditions, with components from which conventional catalysts, such as silicon dioxide/aluminum oxide cracking catalysts, are also prepared.

More particularly, it has been found that the activity and/or selectivity of encapsulated crystalline aluminosilicate zeolite-containing catalysts are greatly improved when the encapsulating or matrix material is comprised of a silicon dioxide sol or gel, or mixture thereof, which may or may not contain zeolite, and which is combined, before drying, with a separately prepared co-gel of silicon dioxide and an oxide of at least one metal from groups III–A and IV–A of the periodic table, which co-gel may or may not contain zeolite and may or may not be dried prior to mixing with the silicon dioxide sol or gel, whereupon the resulting composition is subjected to further gelation if necessary and then dried and activated.

To achieve good results with the above process according to this invention, it is essential that the co-gel to be added should be prepared separately and that the combination with the silicon dioxide sol or gel or mixture thereof should take place before the latter has been dried.

The silicon dioxide sol or gel can be obtained in any known way, for example, by reacting aqueous solutions of alkali metal salts with acids, as by reacting sodium silicate with sulphuric or hydrochloric acid. Of course, when the silicon dioxide sol or gel is prepared by the foregoing reaction, the resulting silicon dioxide sol or gel has to be purified to free it from undesirable by-products, such as alkali metals, sulphate ions, and the like.

In a preferred embodiment of the invention, use is made of a silicon dioxide sol or gel containing not more than 0.01% by weight of alkali metal oxide, based on the sol or gel. A particularly suitable sol or gel is one which consists practically entirely of silicon dioxide, for example, as can be obtained by the hydrolysis of ethyl orthosilicate.

The separately prepared co-gel of silicon dioxide and an oxide of at least one metal of groups III–A and IV–A of the periodic table for use in the process according to the invention is preferably a silicon dioxide/aluminum oxide co-gel. However, other co-gels are also suitable, such as, co-gels of the following: silicon dioxide/thorium oxide, silicon dioxide/titanium dioxide, silicon dioxide/zirconium oxide, silicon dioxde/alumnum oxide/thorium oxide, and silicon dioxide/aluminum oxide/zirconium oxide. In the above-mentioned co-gels, silicon dioxide frequently forms the main constituent and its content, based on dry substance, is generally 55–95% by weight, while the metal oxide content then varies between 5 and 45% by weight. However, in some cases, it is also possible to advantageously use co-gels in which the metal oxide forms the main constituent and the silicon dioxide content is not more than, for example, 1–20% by weight, based on the weight of the finished dry co-gels. The term co-gels as used herein includes gels composed of the above-mentioned metal oxides and obtainable, for example, by co-precipitation from the associated dissolved metal salts or by mixture of the separate metal oxide gels with one another. The co-gels may be used in either the dried or undried state, that is, the co-gel may be either dried or undried at the time of mixing with the silicon dioxide sol or gel provided that the latter is not dried prior to such mixing. If the co-gel is used in the dried state, its particle size can vary within wide limits although it is advisable to make it sufficiently small. A particle size ranging from 5–200 microns is generally suitable. A dried silicon dioxide/aluminum oxide co-gel is preferably used having a particle size ranging from 5–50 microns.

With the process according to the invention it is possible to use any of a large number of natural or synthetic crystalline aluminosilicate zeolites, such as those of the A-type, X-type, Y-type, L-type, D-type, T-type, K-G-type and mordenite type.

In the process according to the invention, synthetic crystalline zeolites of the faujasite type are preferably used. Examples of the latter zeolites are zeolite X (described in U.S. Pat. No. 2,882,244) and zeolite Y (described in U.S. Pat. No. 3,130,007). The composition of these zeolites in their alkali-metal form can be indicated as follows in terms of molar proportions of the oxides: $M_2O$, $Al_2O_3$, $wSiO_2$, $yH_2O$, wherein M denotes an alkali metal atom.

The sodium form of zeolite X has the formula: $(0.9\pm0.2)Na_2O$, $Al_2O_3$, $(2.5\pm0.5)SiO_2$, 0–8 $H_2O$; and the sodium form of zeolite Y has the following formula: $(0.9\pm0.2)Na_2O$, $Al_2O_3$, $(3-6)SiO_2$, 0–9 $H_2O$. These zeolites have a uniform pore structure with openings having an effective diameter of about 6–15 A.

It is well known that when aluminosilicates are to be used as cracking catalysts it is desirable that the zeolites should have an alkali metal content that is as low as possible. A high alkali metal content undesirably reduces the thermal structural stability so that the effective life of the catalyst is adversely affected. This adverse effect of the alkali metal content is described, for example, in Dutch patent application 266,989, wherein it is proposed to lower the alkali metal content by a base exchange process according to which the zeolites are repeatedly or continuously brought into contact with aqueous solutions of salts or other compounds in order to effect the exchange of the alkali metal ions in the aluminosilicate for the cations in the aqueous solution. In this way, alkali metal ions can be replaced by calcium, magnesium, hydrogen and/or precursors, such as ammonium. It is also known, for example, as disclosed in Dutch patent application 296,167, that in such a base exchange the alkali metal ions can be advantageously replaced by ions of the rare earth metals. The presence of the latter ions improves the structural stability of the zeolite and gives it increased resistance to loss of crystallinity. In this base exchange method, the crystalline aluminosilicate is brought into contact with an aqueous solution of salts of rare earth metals (RE), usually rare earth metal chlorides ($RECl_3$), which predominantly comprise the chlorides of Ce, Eu, La, Nd, Pr, Sm and Gd, and also Y-chloride, or with an aqueous solution of didymium chloride (a mixture of rare earth metal chlorides having a low Ce content). These aqueous solutions may also contain hydrogen ions and/or ammonium so that some of the alkali metal ions in the zeolite are replaced by hydrogen and/or ammonium (ammonium is a hydrogen precursor, that is, it can be converted to hydrogen an after-treatment, such as, heating). The zeolite can also be subjected to base exchange by first treating it with an aqueous solution of rare earth metal salts, and then with a solution containing hydrogen and/or ammonium ions. The zeolite employed in the process according to this invention may be subjected to any of the foregoing treatments prior to its incorporation in the matrix forming materials.

In the process according to the invention, the zeolite can be incorporated in the silicon dioxide sol and/or gel or in the separately prepared co-gel which may or may not be dried. Alternatively, a silicon dioxide sol and/or gel which contains zeolite can be combined with a co-gel which also contains zeolite. Preferably, a zeolite-containing silicon dioxide sol is combined with a wet co-gel. After the combination of the catalyst components, the silicon dioxide sol, which possibly has not yet set into a gel, is subjected to gelation, and the total gel is dried and activated in a manner known per se. The resulting catalytically active end product is very suitable as a catalyst for hydrocarbon conversions, for example, for hydrocarbon cracking, in which hydrocarbon oils having a high boiling range are converted to hydrocarbons having a low boiling range. The catalyst is usually processed in a known manner, for example, by extrusion, pelleting, and the like, to form shaped elements such as granules, pills, pellets and the like. The invention will now be further described with reference to the following, merely illustrative examples:

EXAMPLE I 50 g. of an aqueous suspension containing 10% by weight of crystalline aluminosilicate zeolite of the type Y, were mixed with 280 g. of a wet silicon dioxide/aluminum oxide co-gel containing 6.2% by weight of $SiO_2$, 0.9% by weight of $Al_2O_3$ and 92.9% by weight of $H_2O$. The composition of the crystalline aluminosilicate, based on dry substance, was as follows:

| | Percent |
|---|---|
| $Na_2O$ | 0.2 |
| $RE_2O_3$ | 20.0 |
| $Al_2O_3$ | 18.6 |
| $SiO_2$ | 60.8 |

The zeolite-containing wet co-gel was added to 1250 g. of an aqueous silicon dioxide sol containing 6.0% by weight of $SiO_2$, and the particle size of which was 30 A. Before the addition, the sol was heated to a temperature of 50° C. and adjusted to a pH of 6.0 by means of $NH_3$. After the $SiO_2$ sol had been set into a gel, the zeolite-containing mixture of co-gel and silicon dioxide gel was dried for 17 hours at 120° C. and finally ground. Before the activity and selectivity of the resulting catalyst were determined, as hereinafter described in detail, the said catalyst was heated for 17 hours at 750° C. in a steam atmosphere.

EXAMPLE II 50 g. of the aqueous zeolite suspension identified in Example I were mixed with 280 g. of the wet co-gel identified in Example I. The resulting mixture was dried for 17 hours at a temperature of 120° C., whereupon it was ground into a powder having a particle size less than 40 microns. This dry powder was added to 1250 g. of aqueous $SiO_2$ sol containing 6% by weight of $SiO_2$ and the particle size of which was 30 A. The temperature of the sol was 50° C. before the addition of the powder and its pH was adjusted to 6.0 by means of $NH_4OH$. After the $SiO_2$ sol had set into a gel the mixture was dried at a temperature of 120° C. for 17 hours and then finally ground. Before determining the activity and selectivity of the resulting catalyst, as hereinafter described, such catalyst was heated for 17 hours at 750° C. in a steam atmosphere.

In order to provide a basis for comparison of the activity and selectivity of catalysts produced in accordance with this invention, as in Examples I and II above, with other catalysts prepared by processes that do not embody this invention or depart from essential conditions thereof, such other catalysts were produced as indicated below in Examples A, B and C.

EXAMPLE A 50 g. of the aqueous zeolite suspension identified in Example I were mixed with 280 g. of the wet co-gel identified in Example I. The resulting product was then mixed with 80 g. of practically dry silicon dioxide gel having a particle size of 5–100 microns. The mixture was then dried as described in Example I, and then steamed at 750° C. in the manner indicated in the preceding examples.

EXAMPLE B 50 g. of the aqueous zeolite suspension identified in Example I were mixed with 280 g. of the wet co-gel described in that example. The mixture was dried at 120° C. for 17 hours and then ground to a particle size of 40–140 microns, and thereafter mixed, in the form of a dry powder, with 80 g. of practically dry silicon dioxide gel having a particle size of 5–100 microns. The resulting catalyst was steamed at 750° C. in the manner indicated in the preceding examples.

EXAMPLE C 50 g. of the zeolite suspension identified in Example I were mixed with 1340 g. of aqueous co-gel containing 6.2% by weight of $SiO_2$ and 0.9% by weight of $Al_2O_3$. The mixture was dried at 120° C. for 17 hours and finally ground. The resulting catalyst was steamed at 750° C. as in the preceding examples.

The catalysts produced by each of the foregoing Examples I and II according to this invention, and by each of the comparative Examples A, B and C, were subjected to the following test for determining the activity and selectivity of the respective catalyst.

For each test, 10–30 g. of the respective catalyst were placed in a reaction column between two layers of inert material consisting of quartz grains and the reaction column was heated to 500° C. The test itself comprised 9 cycles, each cycle consisting of the following 5 stages:

Stage 1 (duration 8 minutes): Nitrogen was fed through the reaction column, through a collector vessel connected to the bottom of the column, and through the connecting conduits.

Stage 2 (duration 3 minutes): The feed oil, a Mid-Continent gas oil (specific gravity 0.866 g. per cc.; boiling range 272–405° C.) was introduced at the top of the column at a feed rate of 25–40 ml. per hour. Under these conditions, the nitrogen was displaced from the reactor by the resulting gaseous products and the latter were carried off.

Stage 3 (duration 10 minutes): The reaction products were collected in the collector vessel, which was cooled to 0° C. The non-condensed reaction products were collected in a gas bottle above an aqueous common salt solution. The rate of feed of the feed oil was equal to the feed rate in Stage 2.

Stage 4 (duration 24 minutes): Nitrogen was passed through the column at a rate of 6 liters per hour, and the reaction products still present in the column were carried off.

Stage 5 (duration 55 minutes): Air was introduced at a rate of 20 liters per hour. Under these conditions the catalyst was regenerated, the coke deposited thereon during the reaction being burnt. The resulting water and $CO_2$ were collected in pre-weighed U-tubes respectively filled with $MgClO_4$ and sodium hydroxide-asbestos. (Any CO produced was first converted to $CO_2$ by passing the gases over CuO at 800° C.). The amount of coke forming during the reaction was determined from the increase in the weight of the U-tubes.

The reaction products collected in the collector vessel after 9 cycles were divided, by distillation, into the following three fractions:

(1) A gas fraction, consisting of components having a boiling point below 35° C.; this fraction was added to the gas already collected in the gas bottles.

(2) A gasoline fraction consisting of components having a boiling point below 204° C.

(3) A residue consisting of components having a boiling point above 204° C.

The activity and selectivity of the several catalyst samples were compared to the same characteristics of an amorphous standard catalyst (having an $Al_2O_3$ content of 13% and which had also been heated for 17 hours at 750° C. in a steam atmosphere) when subjected to the above test.

As previously indicated, the activity for each sample catalyst was calculated as follows:

$$\text{Activity} = \frac{\text{WHSV through sample catalyst}}{\text{WHSV through standard catalyst}} \times 100$$

for equal conversion with respect to the sample catalyst and the standard catalyst. As before, the conversion is defined as:

$$\text{Conversion in percent} = \frac{W_F - W_f}{W_F} \times 100$$

with $W_F$ and $W_f$ having the previously defined meanings. Further, in the above definition of "activity," the term WHSV has the following meaning:

$$\text{WHSV} = \frac{\text{weight of oil feed per hour}}{\text{weight of catalyst}}$$

The selectivity for each sample catalyst was determined by the gasoline factor, gas factor and coke factor therefor, which factors have the following definitions:

$$\text{Gasoline factor} = \frac{\text{gasoline yield with sample catalyst}}{\text{gasoline yield with standard catalyst}}$$

$$\text{Gas factor} = \frac{\text{gas production with sample catalyst}}{\text{gas production with standard catalyst}}$$

$$\text{Coke factor} = \frac{\text{coke production with sample catalyst}}{\text{coke production with standard catalyst}}$$

with each of the above factors being determined for equal conversions with respect to the sample catalyst and the standard catalyst.

The results of the comparative tests are given in the following table:

TABLE 1

| Sample catalyst from example | Activity | Selectivity | | |
|---|---|---|---|---|
| | | Gasoline factor | Gas factor | Coke factor |
| I | 427 | 1.36 | 0.63 | 0.38 |
| II | 444 | 1.36 | 0.16 | 0.37 |
| A | 281 | 1.29 | 0.66 | 0.54 |
| B | 276 | 1.13 | 0.72 | 1.19 |
| C | 395 | 1.24 | 0.78 | 0.46 |

From these results it is apparent that the catalysts prepared by the process according to the invention (Examples I and II) have a much better combination of activity and selectivity than the other catalysts (Examples A, B and C) which were not prepared according to the invention.

In the above Examples I and II according to this invention, the crystalline aluminosilicate zeolite was introduced into the silicon dioxide/aluminum oxide co-gel prior to the mixing with the wet silicon dioxide sol or gel. However, this order of mixing is not essential so long as the silicon dioxide sol or gel is mixed with the co-gel prior to the drying of the silicon dioxide sol or gel. Thus, for example, the zeolite may be introduced into the co-gel which is then mixed with the silicon dioxide sol or gel, as in the following examples.

EXAMPLE III 40 g. of the zeolite suspension described in Example I were added to 1270 g. of an aqueous silicon dioxide sol containing 6% by weight of $SiO_2$ and the particle size of which was 30 A. The sol was preheated to 50° C. and the pH was adjusted to 6.0 by means of $NH_4OH$. 280 g. of the wet silicon dioxide/aluminum oxide co-gel described in Example I were added to the resulting mixture. The total resulting gel was dried for 17 hours at 120° C. and finally ground. After steaming at 750° C. for 17 hours the activity and selectivity of the catalyst were determined in the manner described above. The results are given in Table 2 below.

EXAMPLE IV 40 g. of the crystalline aluminosilicate zeolite suspension described in Example I were added to 1270 g. of the aqueous 6% $SiO_2$ sol at a temperature of 50° C. and having a pH of 6. 23 g. of a predried silicon dioxide/aluminum oxide co-gel were then added to the mixture. The composition of the dried co-gel was: 11.3% $Al_2O_3$, 75.7% $SiO_2$ and 13% $H_2O$ and after grinding the particle size was less than 40 microns. After the $SiO_2$ sol had set to a gel, the mixture was dried for 17 hours at 120° C. and finally ground. After steaming at 750° C. for 17 hours the activity and selectivity were determined as described above and the results are given in Table 2 below.

In order to provide a basis for comparison of the activity and selectivity of the catalysts produced in Examples III and IV according to this invention with other catalysts prepared by processes that depart from essential conditions of the invention, such other catalysts were produced by the procedures described in the following Examples D, E and F.

EXAMPLE D 40 g. of the aluminosilicate zeolite suspension described in Example I were added to 1270 g. of the aqueous 6% $SiO_2$ sol having a particle size of 30 A. The sol was preheated to 50° C. and the pH was adjusted to 6.0 by the addition of $NH_4OH$. After the sol had set to a gel, the mixture was dried at 120° C. for 17 hours. After the dried product had been ground, it was mixed with 280 g. of a wet silicon dioxide/aluminum oxide co-gel containing 6.2% of $SiO_2$, 0.93% of $Al_2O_3$ and 93% of $H_2O$. The mixture was then dried at 120° C. and, after steaming at 750° C. for 17 hours, the activity and selectivity of the resulting catalyst were determined in the manner described above with the results appearing in Table 2 below.

EXAMPLE E 40 g. of the aluminosilicate zeolite suspension described in Example I were added to 1270 g. of an aqueous $SiO_2$ sol containing 6% of $SiO_2$ having a particle size of 30 A. The sol was preheated to 50° C. and the pH adjusted to 6 by means of $NH_4OH$. After the sol had set to a gel, the mixture was dried at 120° C. for 17 hours. The dried product was ground and then mixed with 23 g. of a dried and then ground silicon dioxide/aluminum oxide co-gel containing 11.3% of $Al_2O_3$, 75.7% of $SiO_2$ and 13% of $H_2O$. After steaming at 750° C., for 17 hours the activity and selectivity of the resulting catalyst were determined in he manner described above with the results appearing in Table 2 below.

EXAMPLE F 40 g. of the aluminosilicate zeolite suspension described in Example I were added to 1600 g. of an aqueous 6% $SiO_2$ sol having a particle size of 30 A. The sol was preheated to 50° C. and the pH adjusted to 6 by the addition of $NH_4OH$. After the sol had set to a gel the mixture was dried for 17 hours at 120° C. and finally ground. The activity and selectivity of the resulting catalyst were determined in the manner described above after steaming at 750° C. for 17 hours, and the results were as given in Table 2 below.

TABLE 2

| Sample catalyst from example | Activity | Selectivity | | |
|---|---|---|---|---|
| | | Gasoline factor | Gas factor | Coke factor |
| III | 319 | 1.35 | 0.63 | 0.34 |
| IV | 354 | 1.36 | 0.65 | 0.35 |
| D | 223 | 1.32 | 0.67 | 0.40 |
| E | 278 | 1.38 | 0.61 | 0.34 |
| F | 228 | 1.33 | 0.64 | 0.25 |

These results also show that the catalysts prepared by processes according to the invention (Examples III and IV) have a much better combination of activity and selectivity than the other catalysts (Examples D, E and F) not prepared according to the invention.

More specifically, it will be apparent that, by using the process according to this invention, catalysts having a good selectivity but rather poor activity, as in Example F, can be made to have a much improved activity without sacrificing their good selectivity, as in Examples III and IV. Conversely, catalysts having good activity and relatively poor selectivity can have such selectivity improved without sacrificing the original good activity, as will be apparent from a comparison of the catalysts of Examples I and II prepared according to this invention with the catalyst of Example C. Further, in certain cases, catalysts having relatively poor selectivity and activity, as in Example B, can have both of such properties improved through the use of this invention, as in Examples I and II.

What is claimed is:

1. A process for preparing catalysts containing crystalline aluminosilicate zeolites, comprising separately preparing a first substantially wet matrix material selected from the group consisting of silicon dioxide sol, silicon dioxide gel and mixtures thereof, and a second matrix material selected from the group consisting of co-gels of silicon dioxide and an oxide of at least one metal from groups III–A and IV–A of the Periodic Table, introducing a crystalline aluminosilicate zeolite into at least one of said first and second matrix materials, mixing said first and second matrix materials prior to drying of said first matrix material, completing gelation of said first matrix material in the resulting composition in the event that said first matrix material is not already fully gelled, and then drying said composition and activating the resulting catalyst.

2. A process according to claim 1, in which said first matrix material contains a maximum of 0.01% by weight of alkali metal oxide.

3. A process according to claim 1, in which said second matrix material is a silicon dioxide/aluminum oxide co-gel.

4. A process according to claim 3, in which said co-gel is dried prior to mixing with first matrix material and has particles ranging in size from 5 to 50 microns.

5. A process according to claim 1, in which said crystalline aluminosilicate zeolite is a silicate of the faujasite type.

6. A process according to claim 1, in which said crystalline aluminosilicate zeolite is a zeolite of the type Y.

7. A process according to claim 1, in which said crystalline aluminosilicate zeolite is introduced into said first matrix materal.

8. A process according to claim 7, in which said first matrix material is a silicon dioxide sol.

9. Shaped catalyst particles containing the activated catalyst produced in accordance with claim 1.

References Cited
UNITED STATES PATENTS

| | | | |
|---|---|---|---|
| 3,558,476 | 1/1971 | Robbins, Jr. et al. | 252—455 Z |
| 3,346,512 | 10/1967 | Gladrow et al. | 252—455 |
| 3,410,808 | 11/1968 | Smith et al. | 252—453 |

CARL F. DEES, Primary Examiner

U.S. Cl. X.R.

252—453, 455 Z

UNITED STATES PATENT OFFICE
CERTIFICATE OF CORRECTION

Patent No. 3694378          Dated September 26, 1972

Inventor(s) JOHANNES EBREGT

It is certified that error appears in the above-identified patent and that said Letters Patent are hereby corrected as shown below:

In the heading of the patent:

"Johannes Ebregi, Boomweijdt 15, Heiloo, Netherlands" should be -- Johannes Ebregt, Boomweijdt 15, Heiloo, Netherlands, assignor to Koninklijke Zwavelzuurfabrieken Voorheen Ketjen N.V., a corporation of the Netherlands --.

Signed and sealed this 17th day of April 1973.

(SEAL)
Attest:

EDWARD M. FLETCHER, JR.          ROBERT GOTTSCHALK
Attesting Officer          Commissioner of Patents